Dec. 17, 1935.  A. RYDQUIST  2,024,880
GRIP CORD AND METHOD OF MAKING SAME
Filed Jan. 26, 1935
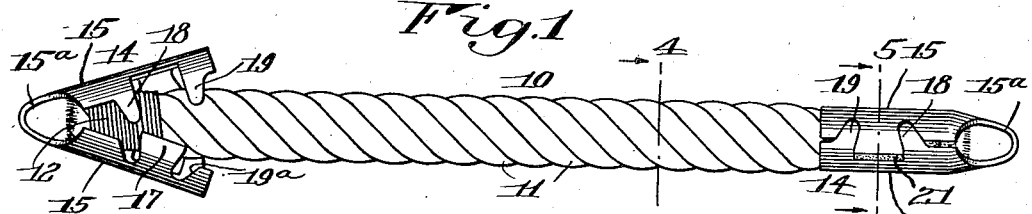
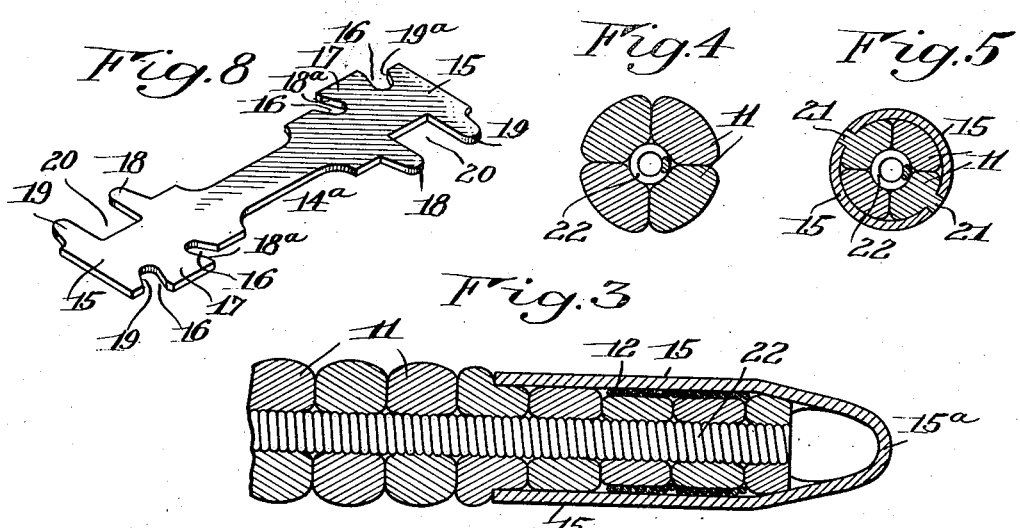
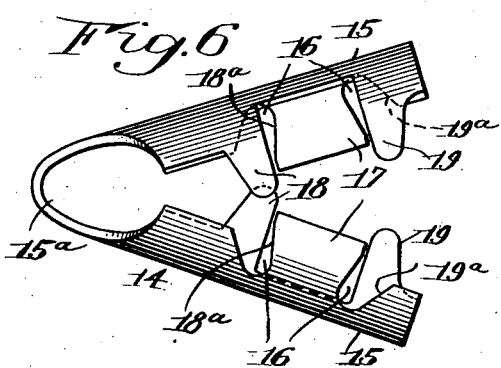
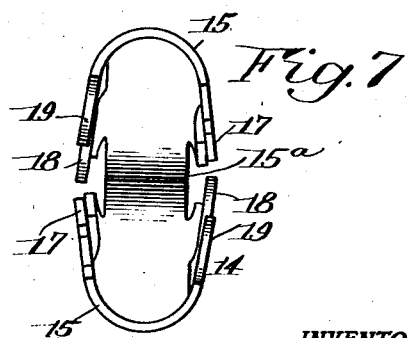
INVENTOR
Adolph Rydquist
BY Edward H. Cumpston
his ATTORNEY Patented Dec. 17, 1935

2,024,880

UNITED STATES PATENT OFFICE 2,024,880

GRIP CORD AND METHOD OF MAKING SAME

Adolph Rydquist, Rochester, N. Y., assignor to The Schlegel Manufacturing Company, Rochester, N. Y., a corporation of New York Application January 26, 1935, Serial No. 3,603

14 Claims. (Cl. 153—1)

The present invention relates to a grip cord or cable and has for its object to provide novel and advantageous improvements in devices of this class relating to an arrangement of parts for strengthening and maintaining the shape of the cord and for attaching it to supporting means therefor.

A further object of the invention is to provide an improved method of constructing grip cords and the like whereby to more effectively and securely anchor the several parts of the cord one upon another.

A further object of the invention is to provide a flexible cord or cable formed of a plurality of strands having a resilient element extending longitudinally of the cable and within the ends thereof and upon which ends improved ferrules or shackles are secured in a manner to render effective cooperation between the parts to prevent loosening or separation of the same under the severest strains to which the cord may be subjected in operation.

A further object of the invention is to provide a novel form of ferrule or shackle for attachment to a cord or cable and one having an improved arrangement of interlocking parts which will permit the ferrule to be clamped upon the cable under relatively high pressure to insure increased and more effective gripping action between the cable and portions of the ferrule contacting therewith.

A further object of the invention is to provide an improved ferrule or similar device initially constructed in the form of a blank and subsequently shaped for application to a cord or cable and having connecting parts, certain of which are cammed into interlocking engagement one with the other when applying the ferrule to the cable.

To these and other ends the invention resides in certain improvements and combinations of parts, all as will be hereinafter more fully described, the novel features being pointed out in the claims at the end of the specification.

In the drawing:

Fig. 1 is a side view of a grip cord embodying one form of the invention in which one of the ferrules is shown as it appears before clamping it upon the cord;

Fig. 2 is a view of the cord taken at a right angle to that shown in Fig. 1 with the unsecured ferrule omitted;

Fig. 3 is an enlarged sectional view taken on line 3—3 of Fig. 2;

Fig. 4 is a transverse section on line 4—4 of Fig. 1;

Fig. 5 is a transverse section on line 5—5 of Fig. 1;

Fig. 6 is a side view of one of the ferrules drawn to an enlarged scale showing the relation of the oppositely positioned arms before clamping the ferrule upon the cord or cable;

Fig. 7 is an end elevation of the ferrule as viewed from the right of Fig. 6, and Fig. 8 is a perspective view of the preformed blank from which the ferrule is shaped as shown in Fig. 6.

The same reference numerals throughout the several views indicate the same parts.

Heretofore in the construction of grip cords or the like having socket members secured on the ends thereof for connecting them with one or more supporting elements, it has been customary to provide on such devices pointed or relatively sharp parts adapted to take into or to become imbedded within the material of the cord, an arrangement which has been found to afford but little advantage as a means for securing the socket members upon the cord.

The present construction is such as to make it possible to avoid the use of any parts on the ferrule which will penetrate or cut the strands of the cord, the ferrule and associated parts shown being so constructed and assembled one upon another as to insure maximum cooperation between the same whereby to prevent displacement of one relative to another by reason of any strains to which the parts may be subjected in operation.

The grip cord is designed for use in connection with different classes of vehicles for assisting the occupants thereof in standing, or in their movements from a standing or sitting position, but may also be employed for other purposes, or under any conditions where it may be found to serve a useful purpose.

Referring to the drawing, the grip cord is indicated generally at 10 and may comprise any suitable type of cord or cable which will be suitable for the purpose intended. Preferably, the cord is formed of a plurality of twisted strands 11, the ends of which are secured one upon another by the thread 12 or other suitable binding material tightly wound thereon.

The ferrules for attachment to the ends of the cord are designated generally by the reference numeral 14 and the blank from which the ferrule is formed is indicated at 14a, Fig. 8. The blanks may be formed as shown by means of suitable dies and are cut from sheet material of the desired thickness. The blank has oppositely extending arms 15 bent to afford a loop 15a, each of the arms having at one side thereof a plurality of oppositely inclined notches 16 with a tapered or beveled lug 17 therebetween, the notches and lugs of the two arms being on opposite sides of the blank.

The arms are each provided with inner and outer tongue-like members 18 and 19 with an opening 20 therebetween for the reception of the beveled lug 17. The tongues lie opposite the notches 16 but instead of being inclined in opposite directions as are the notches, they extend in substantially parallel relation. The tongues of each arm are adapted to engage in the notches of the other arm when the blank has been formed as shown in Fig. 6, and the arms moved into clamping position upon the cable as shown at the right of Fig. 1.

The portions 18a of the lugs 17, each forming one side of one of the notches 16, constitute cams for camming the tongues 18 of the arms into the notches corresponding thereto. Likewise the portions 19a of the arms, each forming one side of one of the notches 16, constitute cams for camming the tongues 19 into their corresponding notches when forcing the arms inwardly upon the cable from the position shown at the left of Fig. 1 to that shown at the right of Fig. 1. In the camming operations the tongues are forced to bend under the resistance offered by the cams and are thus caused to move into proper position within the notches, in which position they become locked by the beveled lugs 17 as indicated on the ferrule shown at the right of Fig. 1.

The proportions of the lugs and tongues of the interlocking arms are preferably such as to provide openings between the outer or free end portion of the lug 17 of one arm and the portion of the other arm lying directly opposite said lug, said opening being provided to permit the material of the cord to be crowded or forced therein, as indicated at 21, under the pressure required to move the arms of the ferrule into interlocking engagement one with another. In this manner portions of the cord or cable become interlocked with the arms of the ferrule whereby the resistance to displacement of the ferrule upon the cable is considerably increased.

The cable is provided with a longitudinally extending core 22 preferably formed of resilient material which, while yielding to a certain extent under the pressure employed to clamp the arms of the ferrule upon the cable, will nevertheless afford a very considerable resistance to the clamping operation whereby the material of the cord lying within the ferrule will be tightly compressed and firmly secured upon said resilient element under sufficient pressure to prevent any displacement of the parts regardless of the strains to which they may be subjected during operation. As one example of such an element, I have provided a spring having closely disposed coils which operate to resist compression and distortion to such an extent as to permit of the application of a very considerable degree of pressure to the arms of the ferrule when clamping them upon the cord whereby to obtain sufficient compression of the material of the cord within the ferrule as to insure the desired gripping action between the parts. Under such pressure the resistance to displacement of the ferrule will be sufficient to maintain it in position under all conditions of operation. Furthermore the resistance to relative movement between the strands of the cord and the spring within the ferrule is considerably increased by reason of the fact that the inner portions of the strands are forced into the grooves afforded by the close relationship of the coils of the springs lying within the ferrule.

Furthermore the spring or resilient element 22 serves to maintain the shape of the cord and to return it to normal position when deflected therefrom as well as to reduce the strains to which the cord would otherwise be subjected.

The method of constructing the cord, aside from the twisting of the strands upon the resilient core and the securing of their ends thereon, comprises the formation of the blank, by means of a suitable die, as shown in Fig. 8 to provide for the interlocking parts illustrated and described. The next operation is that of forming the blank in a suitable die to provide the trough-shaped or substantially semi-circular arm portions 15, after which the blank is bent upon itself to form the loop 15a and to position the arms 15 in the angular relation shown in Fig. 6.

The end of the cord is then inserted between the arms, or the latter positioned to receive the cord, as shown in Fig. 1, after which a clamping die is employed to force the arms inwardly upon the cord, not only to cause the tongues 18 and 19 to be cammed within their corresponding notches, but also to shape the arms and the tongues and lugs thereon so as to afford a substantially continuous cylindrical wall or body portion in surrounding and clamping engagement with the end of the cord, in which operation the ferrule will be securely anchored upon the cord.

I claim:

1. A cable having a ferrule thereon, comprising connected arms, one having spaced notches therein with a beveled lug between the notches and another having tongues forced into the notches in engagement with the side edges of the lug and secured by said beveled lug against withdrawal from the notches.

2. A cable having a ferrule secured thereon, comprising a pair of arms bent to form a loop, one of the arms having oppositely inclined notches and the other having correspondingly inclined tongues anchored within the notches in interlocking engagement with the arm having the notches, said arms and tongues forming a substantially cylindrical wall clamped upon the cable.

3. A cable formed of a plurality of strands, a ferrule on the cable comprising a pair of arms forming a loop, each of said arms having oppositely inclined notches and each having correspondingly inclined tongues anchored within the notches of the other arm, and a resilient element within the cable having one of its ends disposed within the ferrule, the arms of the ferrule being clamped upon the cable and serving to clamp the strands upon the resilient element to securely anchor the ferrule upon the cable.

4. A cable having a ferrule thereon, comprising a pair of arms forming a loop, said arms each having oppositely inclined notches and each having correspondingly inclined tongues anchored within the notches, openings being formed between each arm and a portion of the other arm lying between the tongues of the latter, said arms being clamped upon the cable and the material of the latter being forced into said openings during the clamping operation to securely anchor the ferrule upon the cable.

5. A cable formed of a plurality of strands and having a ferrule, thereon, comprising a pair of arms forming a loop, said arms each having oppositely inclined notches and each having correspondingly inclined tongues anchored within the notches, openings being formed between each arm and a portion of the other arm lying between the tongues of the latter, a resilient element within the cable having one of its ends disposed within the ferrule, the arms of the ferrule being clamped upon the cable and serving to force the material thereof into said openings and to urge the strands of the cable upon the resilient element to securely anchor the ferrule upon the cable.

6. A cable formed of a plurality of strands, a flexible binding element wound upon one end of the cable for securing the strands one upon another, and a ferrule comprising a pair of arms clamped upon said end of the cable in contact with said binding element, said arms having cooperating interlocking parts for securing the arms in interlocking relation, certain of said parts having openings between portions thereof and parts of said binding element being forced into said openings during the clamping operation.

7. A cable provided with a ferrule, comprising a pair of arms bent to form a loop and forced into clamping position upon the cable, said arms each having oppositely inclined notches and each having tongues for engaging the other arm within the notches thereof, said arms having cams at one side of each of said notches and the tongues being bent by said cams and forced thereby into proper position within the notches when bending the arms into clamping position upon the cable, and a coiled spring within the cable extending within the ferrule, the material of the cable surrounding the spring within the ferrule being urged into engagement with said coils whereby to securely anchor the cable upon the spring.

8. A ferrule element for attachment to a cable, said element comprising oppositely positioned arms each having oppositely inclined notches therein with a beveled lug between the notches and each having tongues for engaging the other arm in the notches thereof and for interlocking engagement with said beveled lugs.

9. The method of forming and securing a ferrule upon a cable, comprising shaping a blank to provide oppositely extending arms having parts thereon for interlocking engagement one with another, operating upon the blank to render the arms trough-shaped and to position them in angular relation one relative to another, forcing the arms inwardly upon the cable, and moving said parts into interlocking relation and at the same time shaping the arms and interlocking parts to provide a substantially cylindrical wall around the cable.

10. The method of forming and securing a ferrule upon a cable, comprising shaping a blank to provide oppositely extending arms each having oppositely inclined notches in one side thereof and tongues on its opposite side, operating upon the blank to render the arms substantially semi-circular in shape, bending the blank intermediate its ends and forcing the arms inwardly upon the cable and the tongues of each arm into the corresponding notches of the other arm to interlock the arms one with another.

11. The method of forming and securing a ferrule upon a cable, comprising shaping a blank to provide oppositely extending arms each having notches in one side thereof and tongues on its opposite side, operating upon the blank to render the arms substantially trough-shaped, bending the blank intermediate its ends to form a loop and to position the arms in angular relation one relative to another, forcing the arms inwardly upon the cable and the tongues of each arm into the corresponding notches of the other arm, and shaping said arms and tongues to afford a substantially cylindrical wall in surrounding relation with respect to the cable.

12. The method of forming and securing a ferrule upon a cable, comprising shaping a blank to provide oppositely extending arms each provided with oppositely inclined notches in one side thereof having cam faces and tongues on each arm opposite the notches, operating upon the blank to render the arms substantially semi-circular in shape, bending the blank to position the arms in angular relation one relative to another, inserting the cable between said arms, and forcing the arms inwardly upon the cable and at the same time camming the tongues within the notches and bending them therein to interlock the arms one upon another.

13. A cable having a ferrule on one end thereof comprising a strip bent upon itself to form a loop having arm-like portions extending longitudinally of and in clamping engagement with said cable end, each of said arm-like portions having on each side thereof integral parts in positive interlocking engagement with cooperating parts on the other of said portions whereby said portions are held against separation circumferentially of said cable and are retained in clamping compression upon the cable, said loop extending from the end of the cable to which the ferrule is attached.

14. A ferrule element comprising a strip bendable upon itself intermediate its ends to form a loop with oppositely disposed arms for attachment to the end of a cable, each of the arms having an opening in one side thereof and each having a beveled lug at its opposite side for interlocking engagement with the other arm within the opening thereof, the free end of each lug being wider than its base whereby it will be held against withdrawal from the opening when secured therein, the arms of said element when attached to the cable extending longitudinally thereof and the loop extending outwardly from the end of the cable.

ADOLPH RYDQUIST.